US011916291B2

(12) United States Patent
Boyarsky et al.

(10) Patent No.: US 11,916,291 B2
(45) **Date of Patent: *Feb. 27, 2024**

(54) NYQUIST SAMPLED TRAVELING-WAVE ANTENNAS

(71) Applicant: DUKE UNIVERSITY, Durham, NC (US)

(72) Inventors: Michael Boyarsky, Durham, NC (US); Timothy Sleasman, Durham, NC (US); Jonah Gollub, Durham, NC (US); Seyedmohammadreza Faghih Imani, Tempe, AZ (US); David R. Smith, Durham, NC (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,522

(22) Filed: Jun. 6, 2023

(65) Prior Publication Data

US 2023/0352843 A1 Nov. 2, 2023

Related U.S. Application Data

(63) Continuation of application No. 17/105,020, filed on Nov. 25, 2020, now Pat. No. 11,670,861.

(Continued)

(51) Int. Cl.

*H01Q 11/02* (2006.01)
*H01Q 1/38* (2006.01)

(Continued)

(52) U.S. Cl.

CPC ............... *H01Q 11/02* (2013.01); *H01Q 1/38* (2013.01); *H01Q 13/20* (2013.01); *H01Q 21/08* (2013.01)

(58) Field of Classification Search

CPC .......... H01Q 11/02; H01Q 1/38; H01Q 13/20; H01Q 21/08; H01Q 3/34; H01Q 13/28; H01Q 15/0086

See application file for complete search history.

(56) References Cited

U.S. PATENT DOCUMENTS 7,522,124 B2 4/2009 Smith et al.
8,120,546 B2 2/2012 Smith et al.

(Continued)

FOREIGN PATENT DOCUMENTS

WO 2006023195 A2 3/2006

OTHER PUBLICATIONS

Z. Jacob et al., "Optical hyperlens: Far-field imaging beyond the diffraction limit," Opt. Exp. 14, 8247 (2006).

(Continued)

*Primary Examiner* — David E Lotter
(74) *Attorney, Agent, or Firm* — Kory D. Christensen

(57) ABSTRACT

According to various embodiments, systems and methods for spatial sampling in proximity to the Nyquist limit in traveling-wave antenna systems are disclosed. An apparatus can include a traveling-wave antenna array comprising a plurality of adjacent traveling-wave antennas that each include a plurality of tunable elements that are spaced at, near, or above a Nyquist limit spacing to form an array of tunable elements. The apparatus also includes a phase diversity feed coupled to the traveling-wave antenna array that is configured to provide input to the traveling-wave antenna array including phase diverse input to two or more of the plurality of adjacent traveling-wave antennas. Further, the apparatus includes a plurality of grayscale tuning elements configured to tune the plurality of tunable elements along one or more ranges of one or more tuning variables to form (Continued)

one or more specific output radiation patterns through the traveling-wave antenna array based on the input.

19 Claims, 11 Drawing Sheets

Related U.S. Application Data

(60) Provisional application No. 62/939,746, filed on Nov. 25, 2019.

(51) Int. Cl.
*H01Q 21/08* (2006.01)
*H01Q 13/20* (2006.01)

(56) References Cited

U.S. PATENT DOCUMENTS

| | | | |
|---|---|---|---|
| 8,207,907 B2 | 6/2012 | Hyde et al. | |
| 9,385,435 B2 | 7/2016 | Bily et al. | |
| 11,670,861 B2 * | 6/2023 | Boyarsky | H01Q 21/08 343/702 |
| 2010/0156573 A1 | 6/2010 | Smith et al. | |
| 2012/0194399 A1 | 8/2012 | Bily et al. | |
| 2015/0318618 A1 | 11/2015 | Chen et al. | |
| 2015/0318620 A1 | 11/2015 | Black et al. | |
| 2015/0372389 A1 | 12/2015 | Chen et al. | |
| 2015/0380828 A1 | 12/2015 | Black et al. | |
| 2017/0069967 A1 | 3/2017 | Shrekenhamer | |

OTHER PUBLICATIONS

A. Salandrino and N. Engheta, “Far-field subdiffraction optical microscopy using metamaterial crystals: Theory and simulations,” Phys. Rev. B 74, 075103 (2006).
M. S. Rill et al, “Photonic metamaterials by direct laser writing and silver chemical vapour deposition,” Nature Materials advance online publication, May 11, 2008.
V. Shalaev, “Optical negative-index metamaterials,” Nature Photonics 1, 41 (2007).
S. Linden et al, “Photonic metamaterials: Magnetism at optical frequencies,” IEEE J. Select. Top. Quant. Elect. 12, 1097 (2006).
D. Smith et al., “Metamaterials negative refractive index.” Science 305, 788 (2004).
J. B. Pendry et al, “Magnetism from conductors and enhanced nonlinear phenomena,” IEEE Trans. Micro. Theo. Tech. 47, 2075 (1999).
M. Boyarsky, “Metasurface Antennas for Synthetic Aperture Radar,” Dissertation, Department of Electrical and Computer Engineering, Duke University (2019).
M. Boyarsky et al., “Grating lobe suppression in metasurface antenna arrays with a waveguide feed layer,” Optics Express, vol. 28, No. 16 (2020).
M. Boyarsky, “Electronically Steered Metasurface Antenna,” Center for Metamaterials and Integrated Plasmonics, Department of Electrical and Computer Engineering, Duke University, Durham, NC, USA (2020).
A. K. Sarychev and V. M. Shalaev, Electrodynamics of Metamaterials, World Scientific, (2007).
A. J. Hoffman, “Negative refraction in semiconductor metamaterials,” Nature Materials 6, 946 (2007).
G. Dewar, “A thin wire array and magnetic host structure with n<0,” J. Appl. Phys. 97, 10Q101 (2005).
N. Engheta and R. W. Ziolkowski, eds., Metamaterials. Physics and Engineering Explorations, Wiley-Interscience (2006), ISBN: 978-0-471-76102-0.
C. Caloz, and T. Itoh, Electromagnetic Metamaterials, Transmission Line Theory and Microwave Applications, Wiley-Interscience, (2006), ISBN-10: 0-471-66985-7, ISBN-13: 978-0-471-66985-2.

* cited by examiner 9.0 GHz 9.5 GHz 10.5 GHz 11.0 GHz

NYQUIST SAMPLED TRAVELING-WAVE ANTENNAS

CROSS-REFERENCE TO RELATED APPLICATIONS

This application is a continuation of U.S. application Ser. No. 17/105,020, filed Nov. 25, 2020, for NYQUIST SAMPLED TRAVELING-WAVE ANTENNAS, which claims priority under 35 U.S.C. § 119(e) to Provisional Patent App. No. 62/939,746, filed on Nov. 25, 2019, each of which is hereby incorporated by reference in its entirety.

TECHNICAL FIELD

The present disclosure generally relates to traveling-wave antenna systems, and more particularly, to spatial sampling in proximity to the Nyquist limit in traveling-wave antenna systems.

BACKGROUND

Electronic beam forming and steering is an important capability of antennas in a number of different applications. One way of forming a desired radiation pattern as part of beam forming and steering is to specify the phase and amplitude of the field over an aperture. Fourier optics then provides the quantitative connection between the spatial distribution of the aperture field and the angular distribution of the far-field. Specifically, traditional aperture antennas that generate and steer beams inherently make use of this Fourier relationship.

Traveling-wave antenna arrays have been developed and offer many advantages over other antenna arrays. Specifically, traveling-wave antenna arrays often have a wider bandwidth than traditional antenna arrays. Further, traveling-wave antenna arrays can be cheaper than traditional antenna arrays. One example of a traveling-wave antenna array is a traveling-wave metasurface antenna array. Traveling-wave metasurface antennas typically comprise waveguide structures that include an array of radiating elements in one of the surfaces of the waveguide. However, traveling-wave antenna arrays are subject to the formation of grating lobes in output radiation patterns. Designs have been presented to suppress grating lobes in traveling-wave antenna arrays. Specifically, such designs usually rely on dense radiating element spacing and the incorporation of dielectric components into traveling-wave antenna arrays. However integrating traveling-wave antenna arrays with dense radiating element spacing and dielectric components can present problems. Specifically, this can increase the cost and complexity of such traveling-wave antenna arrays. Further, the close proximity of the radiating elements with respect to each other can make it more difficult to accurately model the operation of the traveling-wave antenna arrays.

SUMMARY

In various embodiments, an apparatus comprises a traveling-wave antenna array comprising a plurality of adjacent traveling-wave antennas. Each of the adjacent traveling-wave antennas includes a plurality of tunable elements that are spaced at, near, or above a Nyquist limit spacing for the apparatus to form an array of tunable elements across the traveling-wave antenna array. The apparatus can also include a phase diversity feed coupled to the traveling-wave antenna array. The phase diversity feed can be configured to provide input to the traveling-wave antenna array including phase diverse input to two or more of the plurality of adjacent traveling-wave antennas. The apparatus can also include a plurality of grayscale tuning elements. The plurality of grayscale tuning elements can be configured to tune the plurality of tunable elements along one or more ranges of one or more tuning variables to form one or more specific output radiation patterns through the traveling-wave antenna array based on the input.

In various embodiments, a method comprises selecting an input to provide to a traveling-wave antenna array comprising a plurality of adjacent traveling-wave antennas. The input can be provided through a phase diversity feed and the input can include a phase diverse input to provide to two or more of the plurality of adjacent traveling-wave antennas. Each of the traveling-wave antennas can include a plurality of tunable elements that are spaced at, near, or above a Nyquist limit spacing for the traveling-wave antenna array to form an array of tunable elements across the traveling-wave antenna array. The method can also include selecting tuning values along one or more ranges of one or more tuning variables for tuning the plurality of tunable elements to form one or more specific output radiation patters. Further, the method can include providing the input to the traveling wave-antenna array through the phase diversity feed.

In various embodiments, a system comprises one or more processors configured to execute store instructions stored on a computer-readable storage medium that when executed by the one or more processors cause the one or more processors to identify characteristics of a plurality of tunable elements in a traveling-wave antenna array comprising a plurality of adjacent traveling-wave antennas. The plurality of tunable elements are spaced at, near, or above a Nyquist limit spacing for the traveling-wave antenna to form an array of tunable elements across the traveling-wave antenna array. The instructions can also cause the one or more processors to model a response of the adjacent traveling-wave antennas in generating specific output radiation patterns from input. The input includes diverse input fed to two or more of the plurality of adjacent traveling-wave antennas over tuning values along one or more ranges of one or more tuning variables. The tuning values can be applied through a plurality of grayscale tuning elements to generate the specific output radiation patterns.

DETAILED DESCRIPTION

Figure 1:
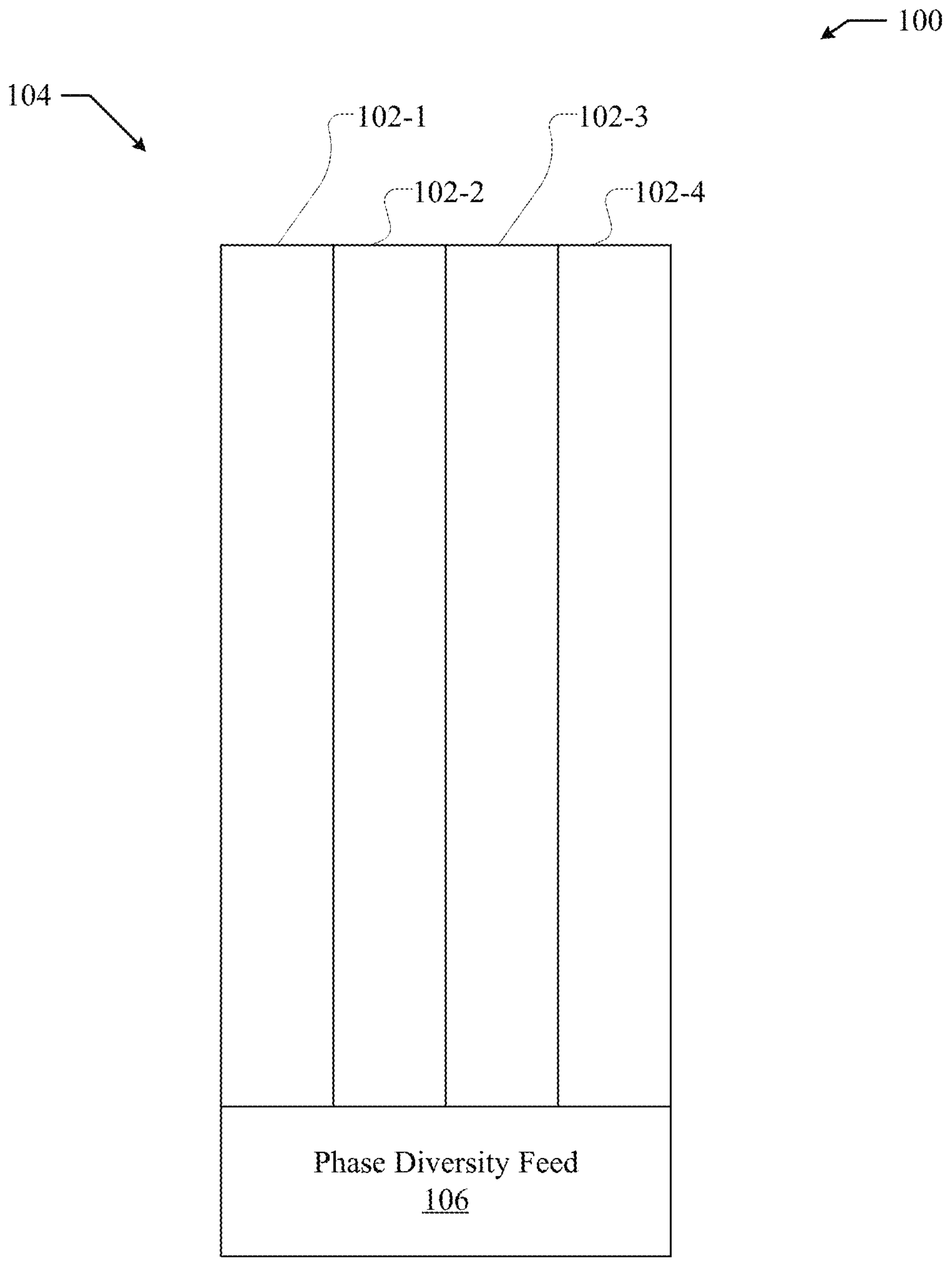
FIG. 1 is an example antenna system configured to provide phase diverse input to an antenna array.

The subject disclosure describes improved systems and methods for providing spatial sampling in proximity to the Nyquist limit in traveling-wave antenna systems. While certain applications are discussed in greater detail herein, such discussion is for purposes of explanation, not limitation.

Embodiments of the systems and methods described herein can be realized using artificially-structured materials. Generally speaking, the electromagnetic properties of artificially-structured materials derive from their structural configurations, rather than or in addition to their material composition.

In some embodiments, the artificially-structured materials are metamaterials. Some exemplary metamaterials are described in R. A. Hyde et al., “Variable metamaterial apparatus.” U.S. patent application Ser. No. 11/355,493: D. Smith et al., “Metamaterials.” International Application No. PCT/US2005/026052: D. Smith et al., “Metamaterials negative refractive index.” Science 305,788 (2004); D. Smith et al., “Indefinite materials.” U.S. patent application Ser. No. 10/525,191; C. Caloz, and T. Itoh, Electromagnetic Metamaterials. Transmission Line Theory and Microwave Applications, Wiley-Interscience, 2006; N. Engheta and R. W. Ziolkowski, eds., Metamaterials. Physics and Engineering Explorations, Wiley-Interscience, 2006; and A. K. Sarychev and V. M. Shalaev, Electrodynamics of Metamaterials, World Scientific, 2007; each of which is herein incorporated by reference.

Metamaterials generally feature subwavelength elements, i.e. structural elements with portions having electromagnetic length scales smaller than an operating wavelength of the metamaterial. In some metamaterials, the subwavelength elements may have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, “Magnetism from conductors and enhanced nonlinear phenomena,” IEEE Trans. Micro. Theo. Tech. 47, 2075 (1999), herein incorporated by reference). Some metamaterials have “hybrid” electromagnetic properties that emerge partially from structural characteristics of the metamaterial, and partially from intrinsic properties of the constituent materials. For example, G. Dewar, “A thin wire array and magnetic host structure with n<0,” J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, “Photonic metamaterials: Magnetism at optical frequencies,” IEEE J. Select. Top. Quant. Elect. 12, 1097 (2006) and V. Shalaev, “Optical negative-index metamaterials,” Nature Photonics 1, 41 (2007), both herein incorporated by reference). An example of a three-dimensional metamaterial at optical frequencies, an elongated-split-ring “woodpile” structure, is described in M. S. Rill et al, “Photonic metamaterials by direct laser writing and silver chemical vapour deposition,” Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

The artificially-structured materials, as described herein, can be arranged on either a surface of a waveguide or on a surface of a cavity. Specifically, the artificially-structured materials can be arranged on either a surface of a waveguide or on a surface of a cavity for purposes of transmitting and/or receiving energy according to the methods and systems described herein. For example, the artificially structured materials can include complementary metamaterial elements such as those presented in D. R. Smith et al, "Metamaterials for surfaces and waveguides," U.S. Patent Application Publication No. 2010/0156573, and A. Bily et al, "Surface scattering antennas," U.S. Patent Application Publication No. 2012/0194399, each of which is herein incorporated by reference. As another example, the artificially-structured materials can include patch elements such as those presented in A. Bily et al, "Surface scattering antenna improvements," U.S. patent application Ser. No. 13/838,934, which is herein incorporated by reference.

Further, the artificially-structured materials, as described herein, can form, at least in part, metamaterial surface antennas. Metamaterial surface antennas, also known as surface scattering antennas, are described, for example, in U.S. Patent Application Publication No. 2012/0194399 (hereinafter "Bily I"). Surface scattering antennas that include a waveguide coupled to a plurality of subwavelength patch elements are described in U.S. Patent Application Publication No. 2014/0266946 (hereinafter "Bily II"). Surface scattering antennas that include a waveguide coupled to adjustable scattering elements loaded with lumped/active devices are described in U.S. Application Publication No. 2015/0318618 (hereinafter "Chen I"). Surface scattering antennas that feature a curved surface are described in U.S. Patent Application Publication No. 2015/0318620 (hereinafter "Black I"). Surface scattering antennas that include a waveguide coupled to a plurality of adjustably-loaded slots are described in U.S. Patent Application Publication No. 2015/0380828 (hereinafter "Black II"). And various holographic modulation pattern approaches for surface scattering antennas are described in U.S. Patent Application Publication No. 2015/0372389 (hereinafter "Chen II"). All of these patent applications are herein incorporated by reference in their entirety.

Some of the infrastructure that can be used with embodiments disclosed herein is already available, such as general-purpose computers, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

Further, while the disclosure describes various embodiments with respect to metasurface antennas, the various embodiments can be implemented through applicable antennas. More specifically, the various embodiments described herein can be implemented through applicable traveling-wave antennas.

As discussed previously, metamaterial surface antennas, also referred to as metasurface antennas and waveguide-fed metasurface antennas, have been developed and integrated into wireless communication systems. The operating principle of metasurface antennas include that the waveguide is used to excite an array of metamaterial radiators coupled to the waveguide. Specifically, as the guided wave traverses the waveguide, each metamaterial element can transmit energy from the guided wave into free space as radiation. The radiation pattern of the aperture is then the superposition of the radiation from each of the elements. Introducing individually addressable tunable components within each metamaterial element facilitates electronic control over the radiation pattern. For applications requiring large reconfigurable antennas, 2D metasurface antenna arrays can be created by tiling several 1D waveguide-fed metasurfaces.

Metasurface antennas offer many advantage over other types of antennas. Specifically, metasurface antennas can derive several of their advantages by exchanging tuning range in favor of low-cost, passive tuning components. As metasurface antennas lack active phase shifters and amplifiers common to conventional beamsteering devices, a metasurface antenna can be tuned by shifting the resonance of each metamaterial element. This is also referred to as tuning a tunable element along a range of a tuning variable. Tuning metamaterial elements this way forgoes full control over the complex response, limiting the available phase states to $-180°<\phi<0$ and coupling the magnitude and phase response. As discussed previously, these constraints can lead to coarse effective element spacing due to a periodic magnitude profile, which causes grating lobes. Further, if each waveguide is excited with the same phase, grating lobes from each waveguide can constructively interfere, thereby magnifying their impact.

Metasurfaces have demonstrated the ability to perform electronic beam forming. However, deficiencies exist in the ability of metasurfaces to perform beam forming and beam steering, especially when compared to a true phase array. Specifically, while an active phase shifter can tune the phase over a range of 0-360°, a passive and resonant metamaterial element can tune across a 0-180° range. Further, the magnitude and phase response of a metamaterial element are linked through resonance. Thus, the phase and magnitude of a passive, radiating element cannot be controlled independently. Despite this constrained control, waveguide-fed metasurface antenna architectures have demonstrated high quality beam forming by compensating for the reduced phase range by densely sampling the aperture (typically on the order of one-sixth or less of the operating wavelength) and leveraging the phase advance of the guided wave.

The number of radiating elements in an applicable antenna, e.g. a metasurface antenna, is typically set by the Nyquist theorem. The Nyquist theorem states that a signal needs to be sampled at a rate twice the highest frequency component present. For aperture antennas, this requirement translates to spatial sampling of half of the operational wavelength across the aperture (depending on the desired steering limits). Specifically, the Nyquist limit spacing, as used herein, is half of the operational wavelength ($\lambda/2$) of an associated aperture, e.g. of a traveling-wave antenna array.

As discussed previously, grating lobes in metasurface antennas can be suppressed by using high dielectrics to decrease the wavelength of the guided wave and positioning the metamaterial elements in a dense spacing. However, this approach can introduce practical challenges in terms of element size and efficiency, In particular, in applications where hollow waveguides are preferred for their efficiency, such as in airborne and space systems, it becomes even more difficult to implement metasurface antennas according to this approach. Further and as will be discussed in greater detail later, this dense spacing can lead to inaccuracies in modeling the responses of the antennas. Accordingly, it is desirable to achieve spatial sampling as close as possible, if not over, the Nyquist limit in traveling-wave antenna systems. In particular, it is desirable to design a metasurface antenna system that has metamaterial elements space at, near, or above the Nyquist limit spacing and is still capable of forming The present includes systems and methods for solving the previously described problems/discrepancies associated with densely packing elements in a traveling-wave antenna. Specifically, the present includes systems and methods for providing a traveling-wave antenna array with tunable elements at, near, or above the Nyquist limit spacing. More specifically, the present includes systems and methods for providing a traveling-wave antenna system that operates based on phase diverse input and includes grayscale tuning elements for tuning tunable elements that are positioned in proximity to the Nyquist limit spacing.

FIG. 1 is an example antenna system 100 configured to provide phase diverse input to an antenna array. The antenna system 100 includes a first traveling-wave antenna 102-1, a second traveling-wave antenna 102-2, a third traveling-wave antenna 102-3, and a fourth traveling-wave antenna 102-4, collectively referred to as the traveling-wave antennas 102. The traveling-wave antennas 102 are adjacent to each other and combine to a form a traveling-wave antenna array 104. Each of the traveling-wave antennas 102 can be a one-dimensional antenna. As follows, the traveling-wave antenna array can function as a two-dimensional antenna array. While the antenna system 100 is shown as having four traveling-wave antennas, the antenna system 100 can include more or fewer adjacent traveling-wave antennas, as long as there are a plurality of adjacent traveling-wave antennas.

The traveling-wave antennas 102 can be an applicable type of antenna that uses a traveling-wave through a guiding structure to radiate energy. Specifically, each of the traveling-wave antennas 102 can use energy that travels through the antennas 102 in one direction to radiate energy from the antennas 102. Specifically, each of the traveling-wave antennas 102 can be formed from a waveguide that is used to radiate energy into free space. Accordingly, the waveguides forming the traveling-wave antennas 102 can be referred to radiating waveguides, as used herein. For example, the traveling-wave antennas 102 can include applicable metamaterial radiating waveguide antennas.

The antenna system 100 also includes a phase diversity feed 106 coupled to the traveling-wave antenna array 104. The phase diversity feed 106 is configured to provide phase diverse input to at least two of the traveling-wave antennas 102 in the traveling-wave antenna array 104. Phase diversity, as used herein, includes that input provided to one or more antennas in a traveling-wave antenna array has a different phase from input provided to one or more other antennas in the array. For example, the phase diversity feed 106 can provide input to the first traveling-wave antenna 102-1 that is offset by 180° from input that the phase diversity feed 106 provides the third traveling-wave antenna 102-3. Input, as used herein, includes applicable input used in radiating energy from traveling-wave antennas in a traveling-wave antenna array. Specifically, input can include energy waves that are guided through traveling-wave antennas along a single direction for radiating energy from the traveling-wave antennas.

Subsequently, the antenna system 100 can be operated with the phase diverse input that is provided to the traveling-wave antenna array 104. Specifically, the traveling-wave antenna array 104 can function to radiate energy using the phase diverse input. Operating the antenna system 100 using phase diverse input can facilitate grating lobe suppression or elimination in an output beam pattern of the antenna system 100. Specifically and as will be discussed in greater detail later, the phase diverse input can cause the individual output of at least some of the traveling-wave antennas to interfere, such that grating lobes are suppressed or eliminated in an output beam pattern.

The phase diversity feed 106 can be an applicable feed for providing phase diverse input to traveling-wave antennas in a traveling-wave antenna array 104. Specifically, the phase diversity feed 106 can be comprised of a plurality of passive phase shifters, e.g. forming an array of passive phase shifters, that are configured to provide input at different phases to two or more of the traveling-wave antennas 102. For example, each of the traveling-wave antennas in the traveling-wave antenna array 104 can have its own corresponding passive phase shifter. As follows, two or more of the passive phase shifters can provide phase diverse input to two or more of the traveling-wave antennas that correspond to the two or more passive phase shifters. For example, a passive phase shifter coupled to the first traveling-wave antenna array 102-1 can provide input to the first traveling-wave antenna 102-1 that is phase shifted with respect to input providing to the third traveling-wave antenna 102-3.

The phase diversity feed 106, as will be discussed in greater detail later, can include a feed waveguide. The feed waveguide is coupled to each of the traveling-wave antennas 102 through one or more applicable coupling mechanism that facilitate guiding of feed waves from the feed waveguide and into the traveling-wave antennas 102 as phase diverse input. Specifically, the feed waveguide can be coupled to the traveling-wave antenna array 104 through corresponding apertures for each of the traveling-wave antennas 102. As follows, the feed waveguide can provide phase divers input to two or more traveling-wave antennas in the traveling-wave antenna array 104 through the corresponding apertures for the two or more traveling-wave antennas. The feed waveguide is distinct from the radiating waveguides forming the traveling-wave antennas 102 based on the output of feed waveguide. Specifically, while the radiating waveguides can output energy into free space, the feed waveguide can output energy to other waveguides, e.g. the radiating waveguides.

The phase diverse input provided to the two or more traveling-wave antennas of the traveling-wave antenna array 104 can include input that is diverse by a specific amount. For example, the phase diverse input can include 180°, 90°, or 45° phase offset between the input provided to the two or more traveling-wave antennas. Further, the phase diverse input provided to the two or more traveling-wave antennas of the traveling-wave antenna array 104 can include input that is randomly or pseudo-randomly made diverse. For example, one or more phase offsets between the inputs provided to the two or more traveling-wave antennas can be randomly or pseudo-randomly selected.

Further, either or both the input and the phase diverse input that is applied through the phase diversity feed 106 can be specifically selected for the antenna system 100. More specifically, the input and/or the phase diverse input can be selected based on one or more characteristics of the traveling-wave antenna array 104. Characteristics of the traveling-wave antenna array 104 can include applicable features of the antenna array 104 including both features related the design and operation of the antenna array 104. For example, either or both the input and the phase diverse input that is applied through the phase diversity feed 106 can be selected based on the number of traveling-wave antenna array 104. Further, either or both the input and the phase diverse input that is applied through the phase diversity feed 106 can be selected based on one or more desired output radiation patterns, e.g. desired output beam patterns.

Figure 2:
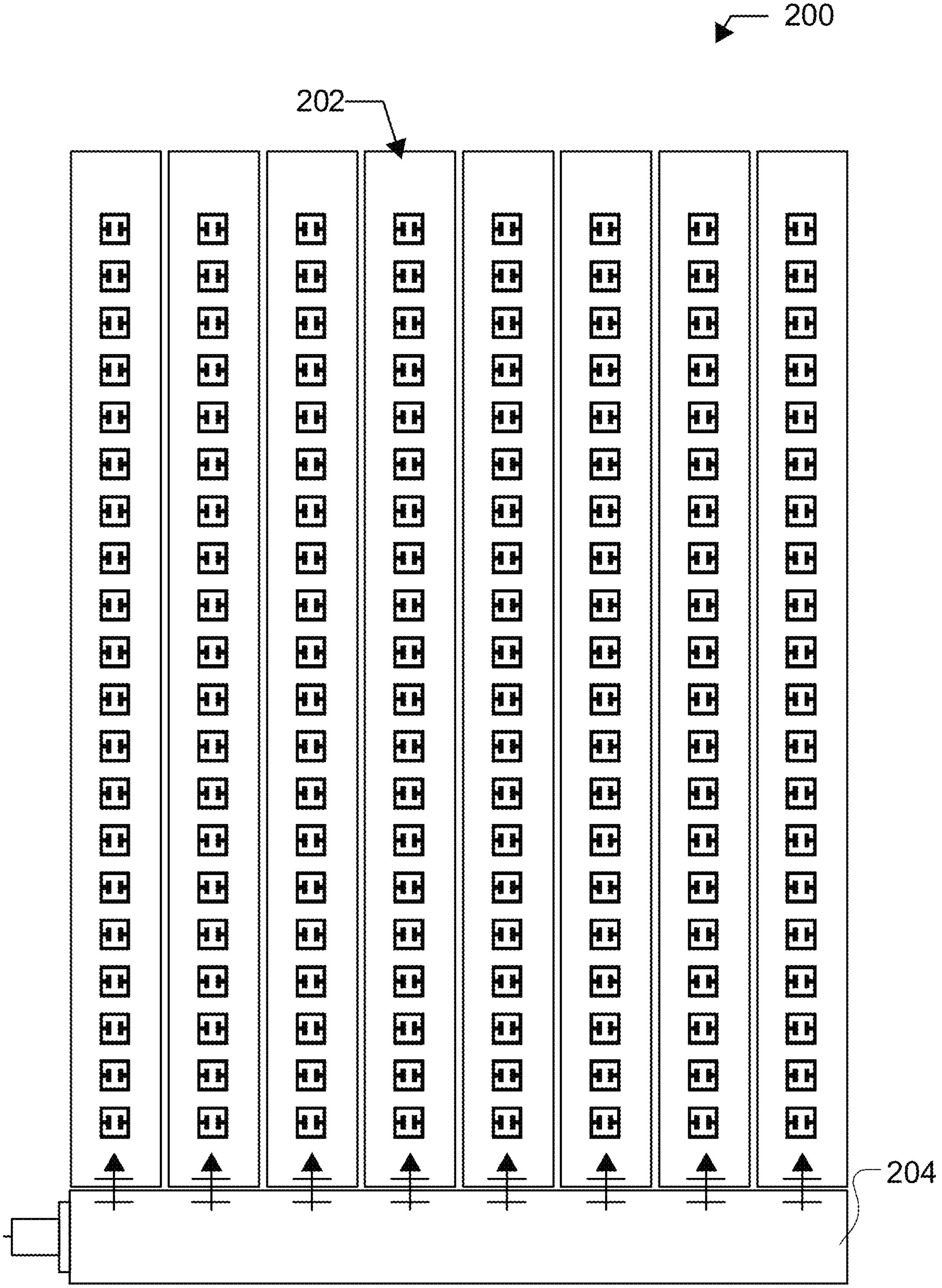
FIG. 2 is another example antenna system configured to provide phase diverse input to an antenna array.

FIG. 2 is another example antenna system 200 configured to provide phase diverse input to an antenna array. The antenna system 200 includes an array of metasurface antennas 202 and a waveguide feed 204. The waveguide feed 204 is configured to provide diverse phase input to two or more metasurface antennas in the array of metasurface antennas 202.

Specifically and to illustrate the grating lobe suppression that is achievable by feeding the antenna system 200 with phase diverse input, the magnetic field for each metamaterial element can be represented as shown in Equation 1.

$$H_{n,m}=H_0 e^{-j\beta y_n+jy_m} \qquad \text{Equation 1}$$

In Equation 1, β is the waveguide constant, $y_n$ is the position measured from an origin, and $y_m$ is the phase applied to the feed of the $m^{th}$ waveguide in the metasurface antenna array 202. As follows the polarizability, e.g. optimal polarizability, as determined by Lorentzian-constrained modulation (LCM), is shown in Equation 2.

$$\alpha_{n,m}=\frac{-j+e^{f(\beta y_n+kx_m \sin\theta_s \sin\varphi_s+ky_n \sin\theta_s \cos\varphi_s-y_m)}}{2} \qquad \text{Equation 2}$$

Based on equation 10, the array factor can be represented as shown below in Equation 3.

$$AF(\theta,\varphi)=\frac{H_0\cos\theta}{2}\left[-j\sum_{n=1}^{N}\sum_{m=1}^{M}e^{-jy_n(\beta+k\sin\theta\cos\varphi)}e^{-j(kx_m\sin\theta\sin\varphi-y_m)}+\sum_{n=1}^{N}\sum_{m=1}^{M}e^{-jky_n(\sin\theta\cos\varphi-\sin\theta_s\cos\varphi_s)}e^{-jkx_m(\sin\theta\sin\varphi-\sin\theta_s\sin\varphi_s)}\right] \qquad \text{Equation 3}$$

In Equation 3, M is the number of waveguides and corresponding antennas in the metasurface antenna array 202. Equation 3 can be separated into two terms. The first term is the grating lobe term. The second term is the beam steering term. The grating lobe term can be separated into the multiplication of two summations as $$\frac{-H_0 j\cos\theta}{2}\sum_{n=1}^{N}e^{-jy_n(\beta+k\sin\theta\cos\varphi)}\sum_{m=1}^{M}e^{-j(kx_m\sin\theta\sin\varphi-y_m)}.$$

To analyze the grating lobes more explicitly, ϕ=0 can be substituted into the previously described multiplication of two summations to yield $$\frac{-H_0 j\cos\theta}{2}\sum_{n=1}^{N}e^{-jy_n(\beta+k\sin\theta)}\sum_{M=1}^{M}e^{jy_m}.$$

In order to cancel the grating lobe term, the summation of $e^{jy_m}$ from m=1 to M should equal 0. Therefore, in order to cancel the grating lobe, $y_m$ is selected as $y_m=\pm mm(2\pi/M)$, such that $e^{jy_m}$ is space in the complex plane. Therefore, feeding metasurface antennas in the metasurface antenna array 202 can suppress or otherwise eliminate grating lobes in an output beam pattern of the metasurface antenna array 202.

Waveguide feed layers, such as the waveguide feed 204 in the example antenna system 200, are advantageous in that they offer both a small form factor and low loss. To suppress the grating lobes, the phase accumulation of the waveguide feed 204 can match a specific $y_m$ as shown in Equation 4.

$$e^{jy_m} = e^{-jm\frac{2\pi}{M}} = e^{-j\beta_f x_m} \quad \text{Equation 4}$$

In Equation 4, $\beta_f$ is the propagation constant of the waveguide feed 204 and $x_m$ is the position along the feed waveguide 204. The waveguide feed 204 sampling the radiating waveguide at a spacing equal to the radiating waveguide width $a_r$ can be mathematically represented according to Equation 5.

$$\beta_f a_r = 2\pi/M \quad \text{Equation 5}$$

Equation 5 is equivalent to Equation 6, which is shown below.

$$a_r\sqrt{\epsilon_0\mu_0\omega^2 - \frac{\pi^2}{a_{f^2}}} = \frac{2\pi}{M} \quad \text{Equation 6}$$

In Equation 6, of is the width of the waveguide feed 204. Accordingly, if the condition shown below in Equation 7 is satisfied, the waveguide feed 204 can provide a phase to two or more radiating waveguides of the metasurface antennas in the array of metasurface antennas 202 that cancel or otherwise suppress the grating lobe(s) according to Equation 7.

$$a_f = \frac{Ma_r\lambda}{2\sqrt{M^2a_r^2 - \lambda^2}} \quad \text{Equation 7}$$

Operating each of the metasurface antennas according to Equation 7 can suppress the grating lobe(s), but can also cause the metasurface antennas to operate close to the cutoff if M is too large. Accordingly, substituting M with an M' that is a factor of M bet greater than 1 can also suppress the grating lobe(s).

Figure 3A:
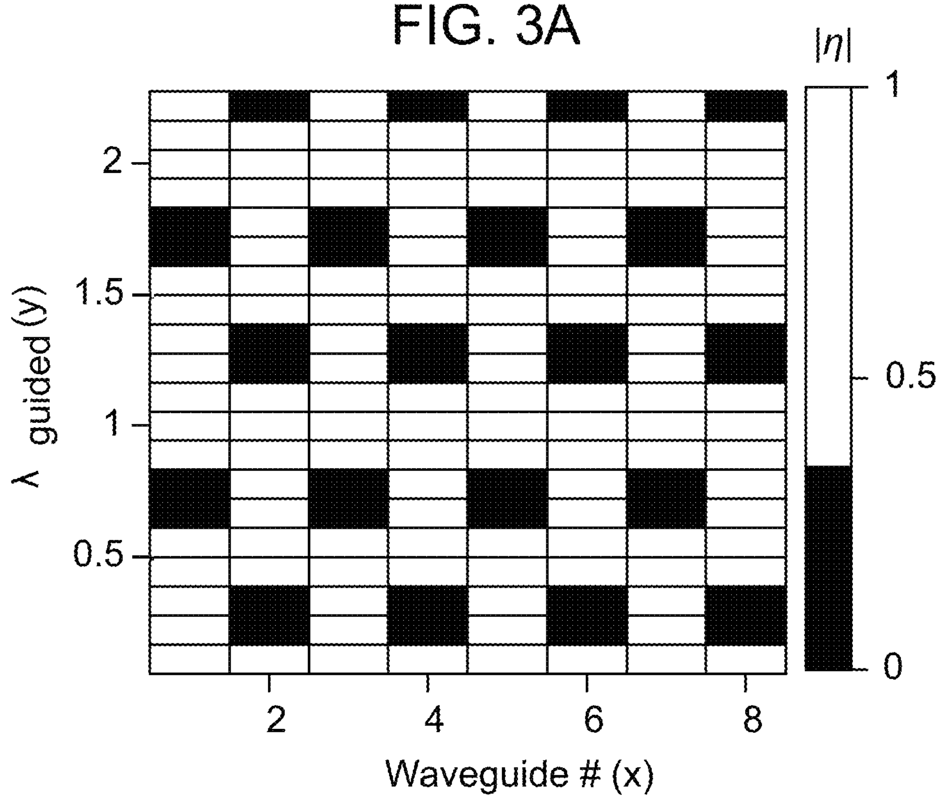
FIG. 3A shows the dipole moments for the metamaterial elements in the corresponding metasurface antennas in the example antenna system.
Figure 3B:
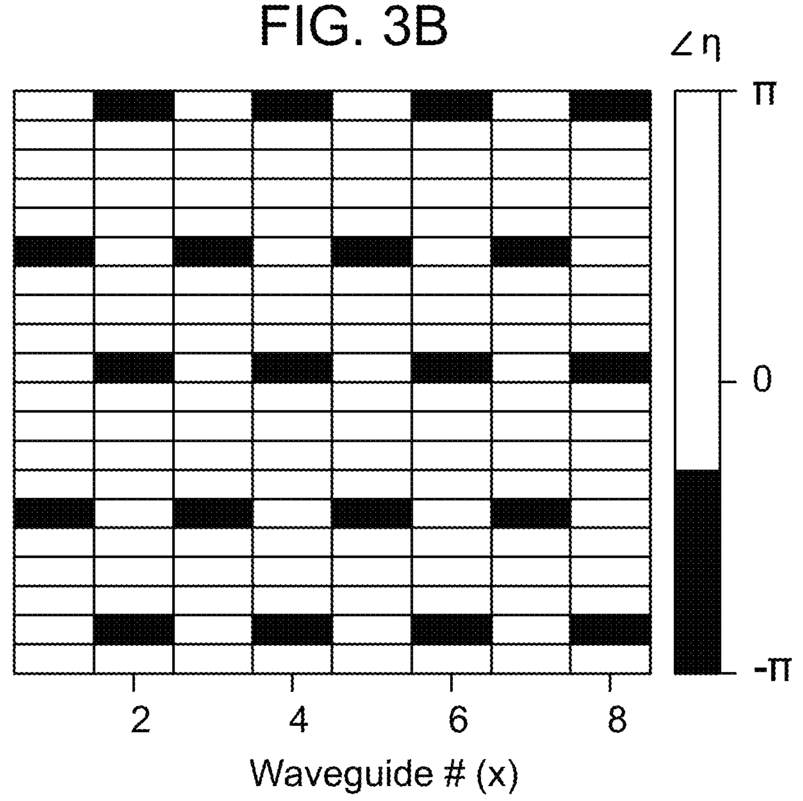
FIG. 3B also shows the dipole moments for the metamaterial elements in the corresponding metasurface antennas represented in the example antenna system.
Figure 4A:
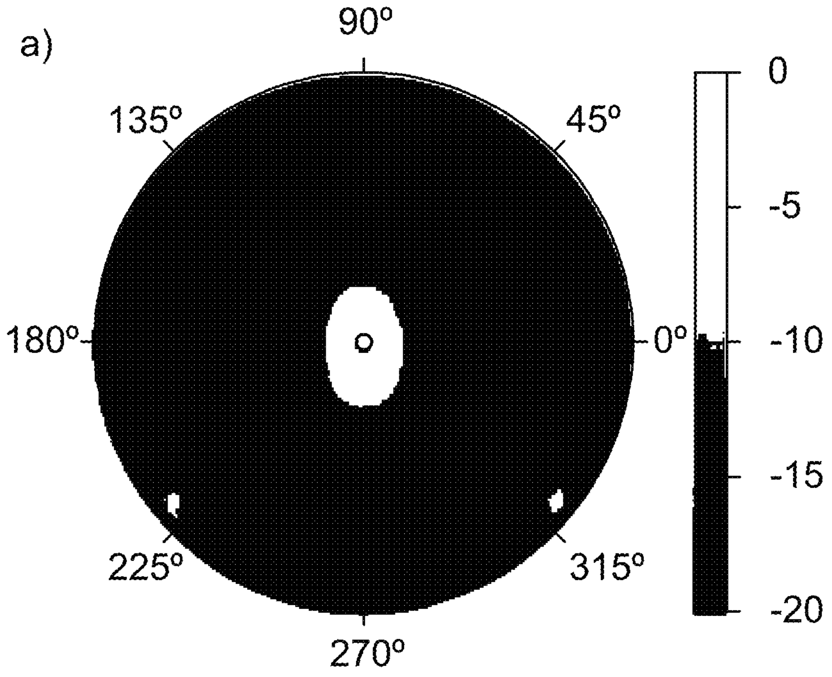
FIG. 4A shows a normalized farfield pattern created through the example antenna system that is fed with phase diverse input.
Figure 4B:
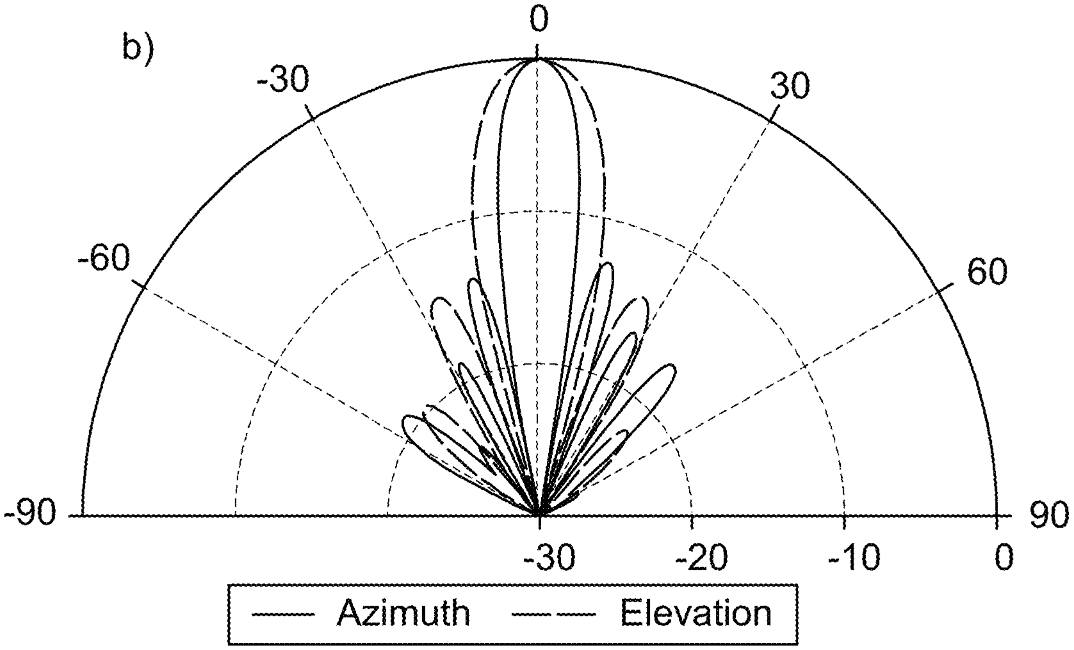
FIG. 4B shows a normalized farfield pattern created through the example metasurface antenna array system that is fed with phase diverse input.
Figure 5A:
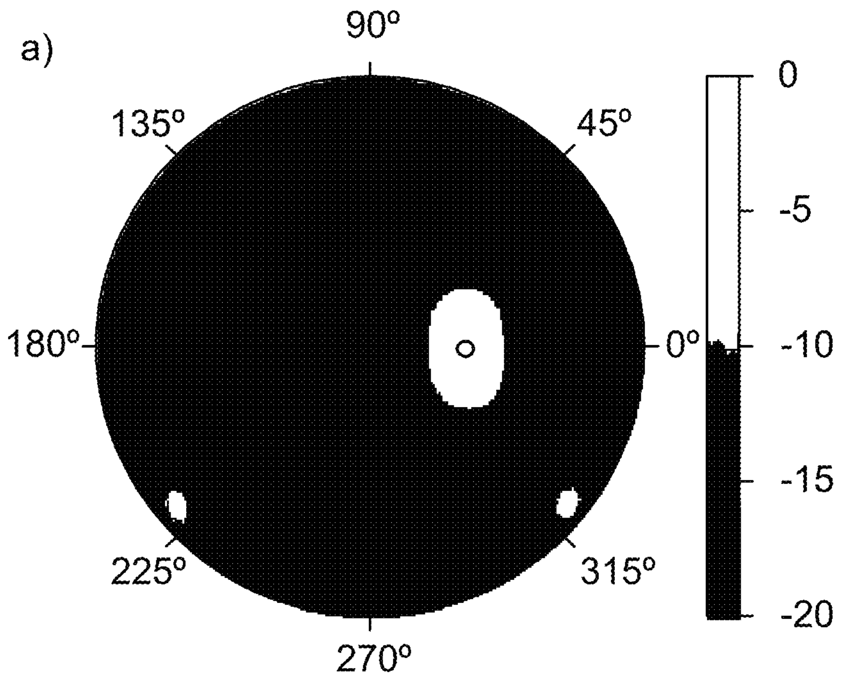
FIG. 5A shows a normalized farfield pattern created through the antenna system that is fed with diverse input and steered to 20° in azimuth.
Figure 5B:
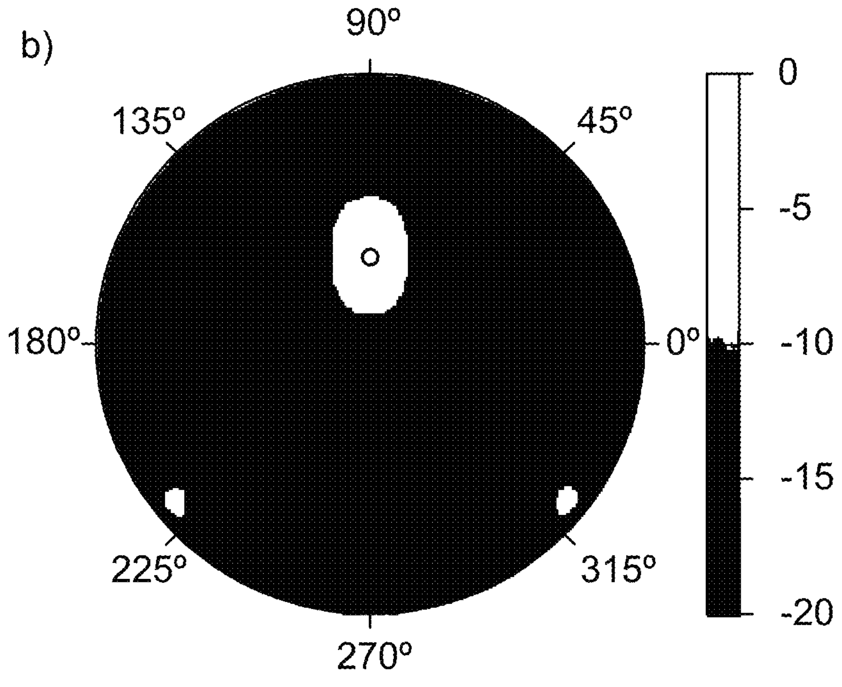
FIG. 5B shows a normalized farfield pattern created through the example antenna system that is fed with diverse input and steered to 20° in elevation.

In an example simulation of the example antenna system 200, M' was selected at 2. This can allow the feed waveguide to operate away from cutoff and help to ensure that the π phase shift between adjacent waveguides cancels or otherwise suppress grating lobes. FIG. 3A shows the dipole moments for the metamaterial elements in the corresponding metasurface antennas in the example antenna system 200. FIG. 3B also shows the dipole moments for the metamaterial elements in the corresponding metasurface antennas represented in the example antenna system 200. FIG. 4A shows a normalized farfield pattern created through the example antenna system 200 that is fed with phase diverse input. FIG. 4B shows a normalized farfield pattern created through the example metasurface antenna array system 200 that is fed with phase diverse input. As shown in FIGS. 4A and 4B the grating lobe is eliminated. Further, as the beam is steered, the grating lobe remains suppressed. Specifically, FIG. 5A shows a normalized farfield pattern created through the antenna system 200 that is fed with diverse input and steered to 20° in azimuth. FIG. 5B shows a normalized farfield pattern created through the example antenna system 200 that is fed with diverse input and steered to 20° in elevation.

M' can be selected based on various applicable factors. Such factors can include applicable characteristics of an antenna system. For example, M' can be selected based on waveguide width of either or both a radiating waveguide and a feed waveguide of an antenna system, dielectric materials used in the antenna system, and whether the feed waveguide is center or edge fed. Alternatively, M' can be randomly selected or otherwise defined.

Grating lobe suppression through application of phase diverse input can be realized across operational frequencies of an antenna system. Specifically, when the example antenna system 200 is simulated at 9.8 GHz, 10.0 GHz, and 10.2 GHz, grating lobe suppression is observed across the frequencies. These results can be improved by integrating the antenna system 200 with components that allow for high switching speeds. Specifically, when the antenna system 200 operates as a transmitter, the tuning state of the metamaterial elements can be updated as the operating frequency of the antenna system 200 changes. In turn, frequency squint can be mitigated in the antenna system 200.

While this disclosure has discussed using LCM, the systems and methods described herein can be implemented using an applicable tuning scheme. For example, the systems and methods described herein can be implemented through direct phase tuning or Euclidean modulation. Specifically, the polarizability of each element can be tuned to match the polarizability prescribed for beamforming. With respect to direct phase tuning, the tuning state of the metamaterial elements can be selected to decrease or otherwise minimize the phase difference between the polarizability expressed in Equation 6 and the polarizability available as a function of tuning state. With respect to Euclidean modulation, the tuning state of the metamaterial elements can be selected to decrease or otherwise minimize the Euclidean norm between the polarizability expressed in Equation 6 and the polarizability available as a function of tuning state.

Figure 6:
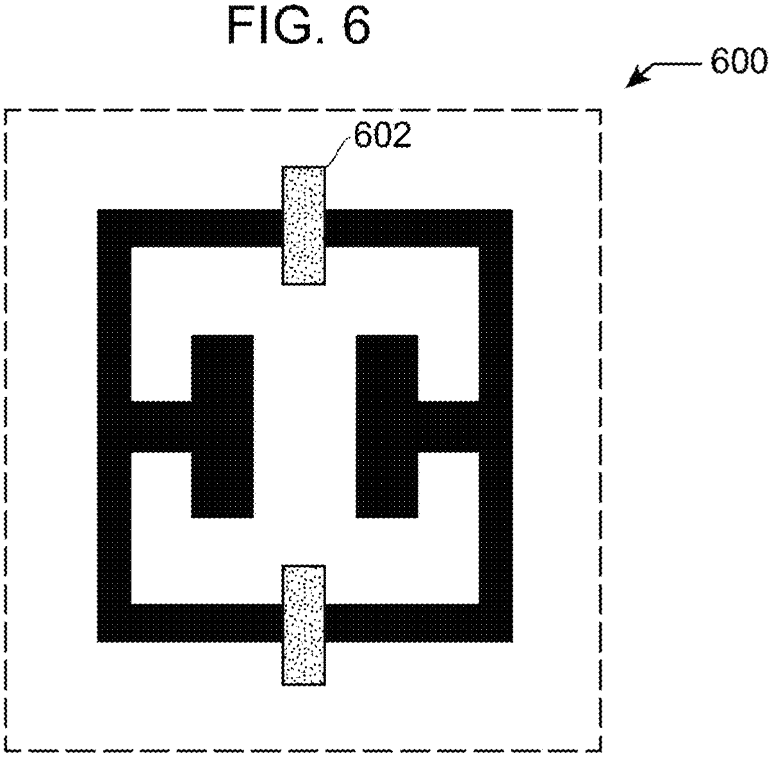
FIG. 6 is a top perspective view of an example tunable radiator.

FIG. 6 is a top perspective view of an example tunable radiator 600. The tunable radiator 600 can form part of an array of tunable radiators in an applicable antenna array, such as the antenna arrays described herein. Specifically, the tunable radiator 600 can be a metamaterial element that functions to emit radiation as part of forming an output radiation pattern.

The tunable radiator 600 includes a grayscale tuning element 602. The grayscale tuning element 602 functions to provide grayscale tuning of one or more characteristics of the tunable radiator 600. Characteristics of the tunable radiator 600 that can be tuned by the grayscale tuning element 602 include applicable characteristics of the tunable radiator 600 that can be modulated during operation of the tunable radiator 600 and ultimately affect the operation of the tunable radiator 600. More specifically and as discussed previously, the grayscale tuning element 602 can be modulated to control a radiation pattern that is formed in part by the tunable radiator 600. For example, a resonance of the tunable radiator 600 can be modulated through the grayscale tuning element 602 to control energy that is radiated from the tunable radiator 600 in forming an output beam.

The grayscale tuning element 602 is configured to provide grayscale tuning. Grayscale tuning, as used herein, refers to tuning along one or more ranges of one or more tuning variable. More specifically, grayscale tuning, as used herein, can refer to tuning across greater than two values of a tuning variable. For example, a resonance of the tunable radiator 600 can be modulated across a range of more than two resonance values. This is in contrast to current tuning elements, e.g. a pin diode, that provide simple on and off tuning control.

The grayscale tuning element 602 can be comprised of one or more applicable components for providing grayscale tuning to the tunable radiator 600. For example, the grayscale tuning element 602 can be a varactor diode. In another example, the grayscale tuning element 602 is formed through a liquid crystal element. Further, the grayscale tuning elements 602 can be formed as part of a plurality of grayscale tuning elements. In turn, each of the grayscale tuning elements can correspond to a single tunable element, e.g. tunable radiator 600, and be used in tuning the corresponding tunable element.

The tunable radiator 600 is part of a plurality of tunable elements that form an array of tunable elements across a traveling-wave antenna array. Further, the plurality of tunable elements are spaced at, near, or above the Nyquist limit spacing for the traveling-wave antenna array. Specifically, the tunable radiator 600 is spaced from other tunable radiators by an amount at, near, or above the Nyquist limit spacing for the traveling-wave antenna array. For example, the tunable elements in the array of tunable elements can be spaced at or within the range of $\lambda/2$ to $\lambda/4$. In another example, the tunable elements in the array of tunable elements can be spaced greater than the Nyquist limit spacing for the traveling-wave antenna array.

As the tunable elements are spaced in proximity to the Nyquist limit spacing, it is important that the tunable elements are tunable through grayscale tuning as opposed to a more binary level of tuning, e.g. on and off tuning. Specifically, as the tunable elements are placed further away than the typical arrays formed by densely packed elements it is important that the tunable elements are tunable through grayscale tuning. More specifically, as the elements are spaced further apart, grayscale tuning provides the ability to more accurately adjust the phase of the elements and achieve the desired phase of output radiation. Further, grayscale tuning can facilitate the suppression of radiation in undesired directions. This is extremely important in certain application spaces such as communication application spaces.

Figure 7:
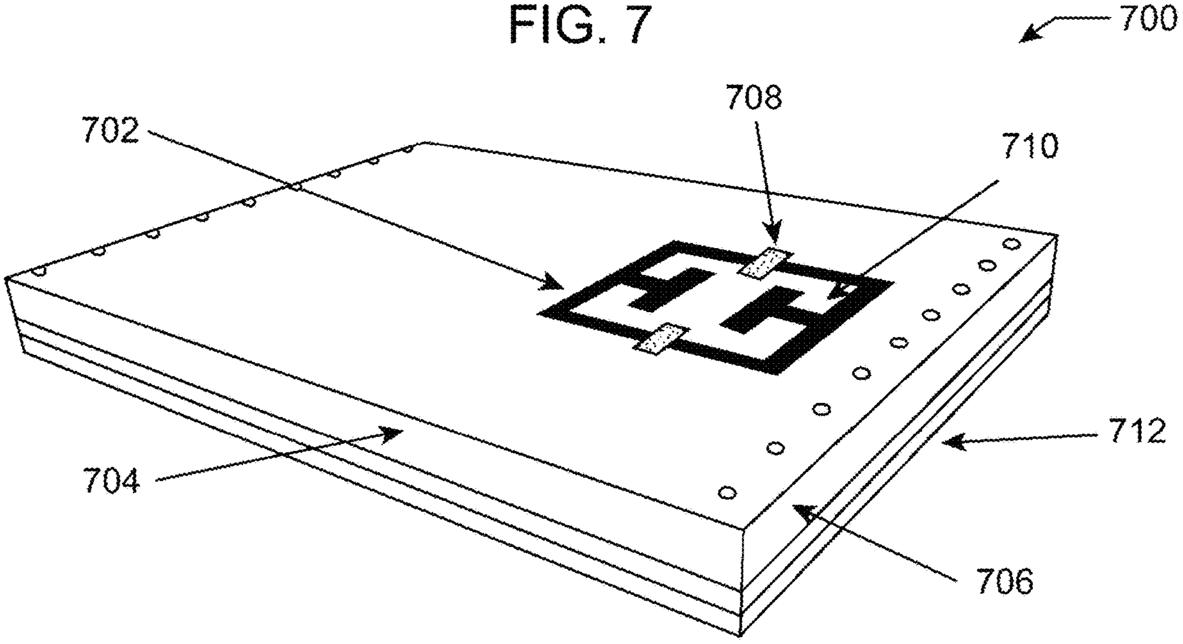
FIG. 7 is a perspective cross sectional view of a portion of an example metasurface antenna.

FIG. 7 is a perspective cross sectional view of a portion of an example metasurface antenna 700. The portion of the example metasurface antenna 700 can be for a 1D metasurface antenna that is part of an array of metasurface antennas that forms a 2D Nyquist metasurface antenna. The portion of the example metasurface antenna includes a metamaterial element 702. The metamaterial element 702 can be part of a plurality of metamaterial elements in the metasurface antenna. In turn, the plurality of metamaterial elements can form part of an array of metamaterial elements across the array of metasurface antennas. Further, the metmaterial elements in the array of metamaterial elements can be spaced near, at, or above the Nyquist limit spacing for the array of metasurface antennas.

The metasurface antenna represented in part in FIG. 7 includes a waveguide 704 that provides energy to the metamaterial elements. The waveguide 704 is formed as a substrate integrated waveguide (SIW) and is formed by SIW vias 706 and metal layers. The metasurface antenna also includes varactor diodes, i.e. varactor diode 708 integrated as part of the metamaterial element 702. The varactor diodes function as grayscale tuning elements and control grayscale tuning of the metamaterial element 702.

The metamaterial element 702 shown in FIG. 7 is designed as a complementary electric-inductive-capacitive (cELC) resonator. Designing the metamaterial element 702 as a cELC is useful because it can electromagnetically behave as a polarizable magnetic dipole with a resonant polarizability, which can be electronically tuned. The varactor diodes are placed across the capacitive gaps between the metamaterial and the surrounding waveguide's upper conductor and function, as described previously, to grayscale tune the resonance. The integration of the varacators in the metamaterial element 702 is advantageous for both size considerations and self-resonant frequency. Specifically, it is important that the self-resonant frequency be significantly higher than the operating frequencies so that the varactor does not add additional inductance or resistance to the circuit. A bias circuit is integrated into the element design, with a control via 710 extending from the center of the cELC through the SIW core and through the bottom conductor of the waveguide 704 to a layer used for biasing circuitry 712. The control via 710 can be positioned near the edge of the SIW to reduce an impact on a guided wave.

Applying voltages between 0-5 V can change the overall capacitance of the metamaterial element 702 and shift the resonance of the element from 8.5 GHz to 10.7 GHz. At 10 GHz, this tunability can equate to 150° of phase tuning and a magnitude ratio of 4.5:1.

Figure 8:
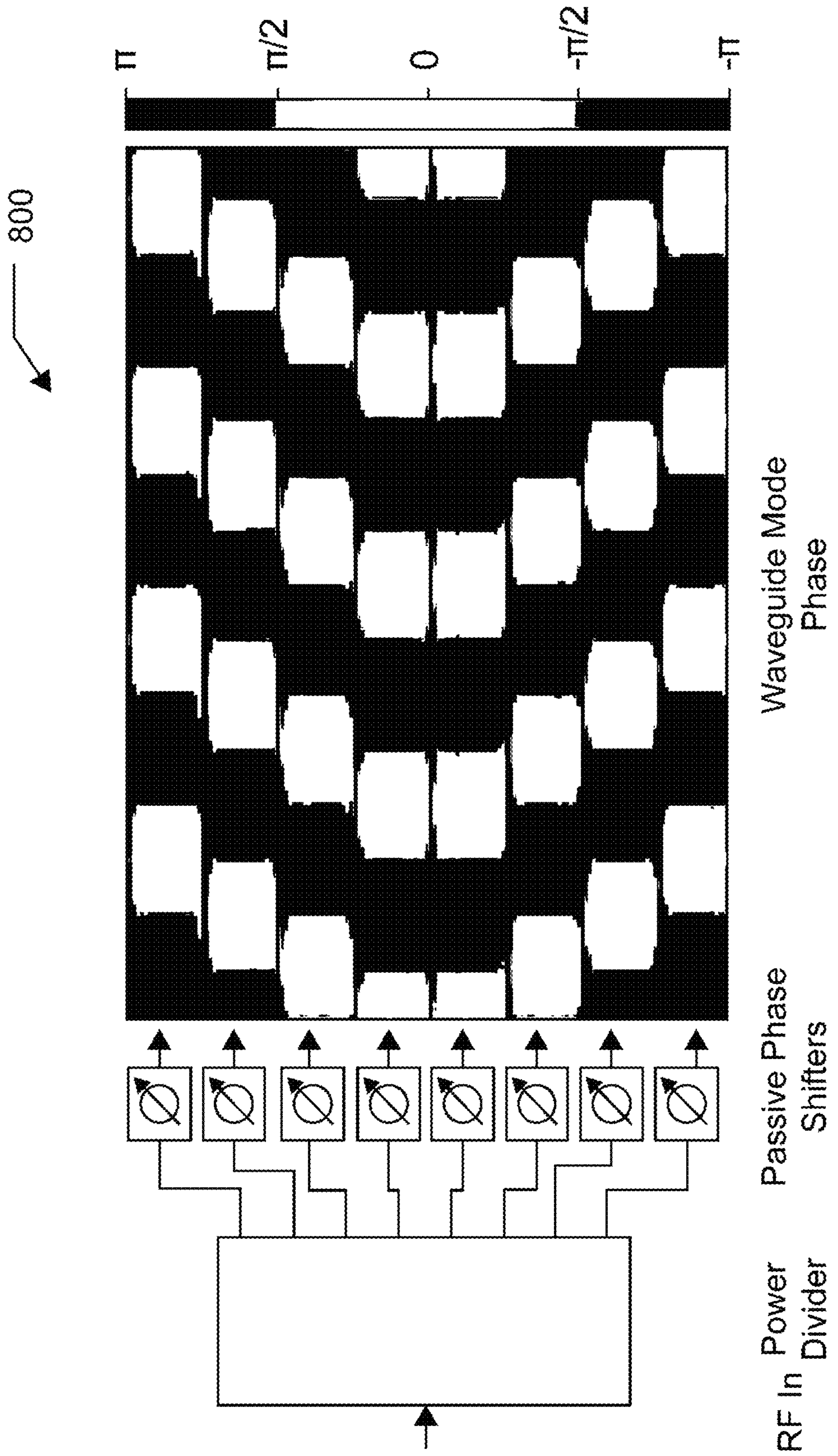
FIG. 8 is a schematic of an example metasurface antenna system with introduced phase diverse input.

FIG. 8 is a schematic of an example metasurface antenna system 800 with introduced phase diverse input. The antenna system 800 is formed with eight adjacent metasurface antennas. Further, the system 800 can include an applicable size termination, e.g. 50 Ω, at the end of each waveguide of each metasurface antenna. This can minimize reflection by absorbing the remaining energy. Launch connectors can use used to launch wave input into each of the metasurface antennas. Specifically, the end launch connector can excite a grounded coplanar waveguide (CPW) mode, which subsequently feeds the metasurface antennas. The phase diverse input from the top metasurface antennas to the top metasurface antennas, as shown in FIG. 8 is 270°, 180°, 90°, 0°, 0°, 90°, 180°, and 270°.

Figure 9:
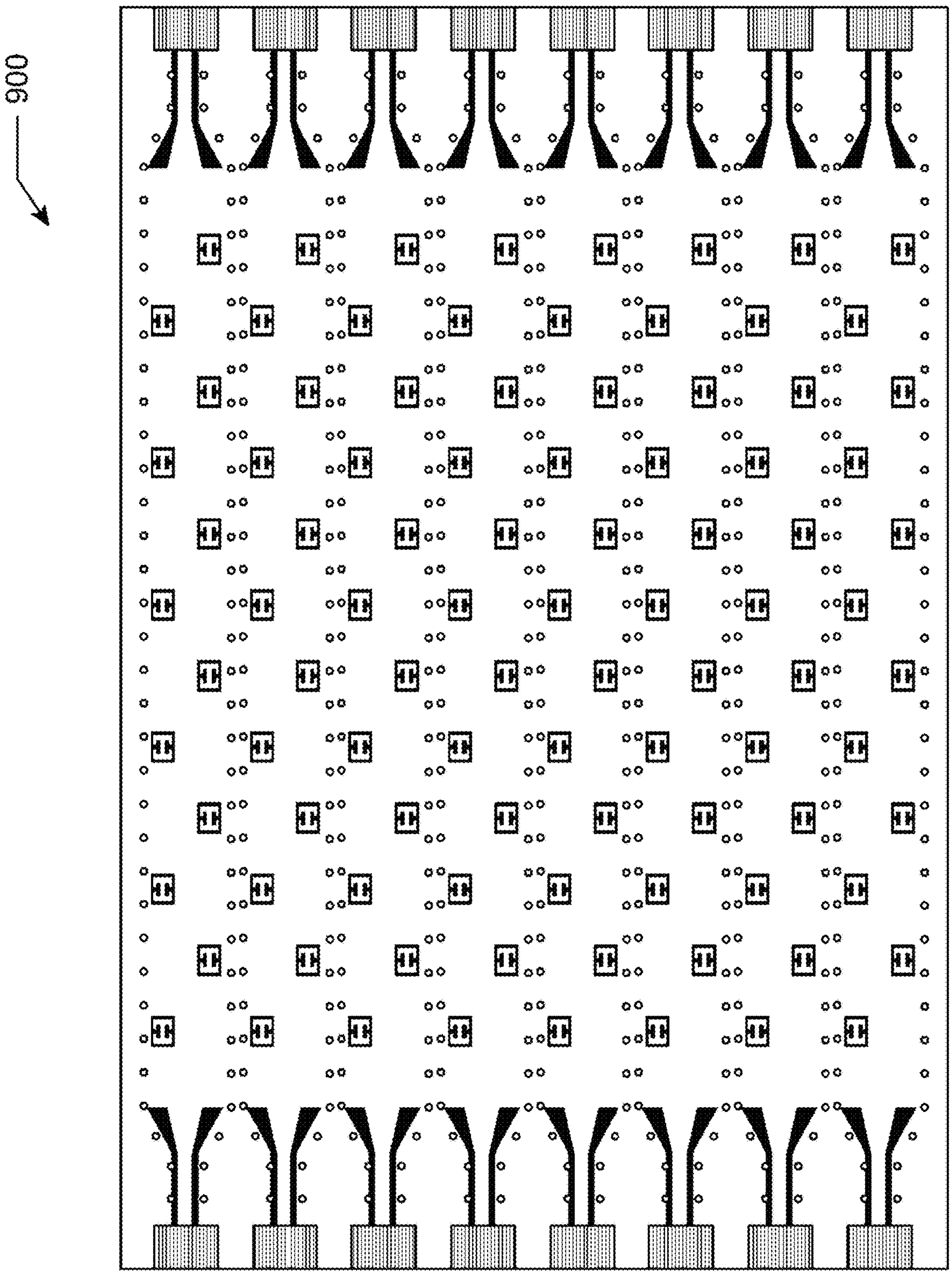
FIG. 9 shows a top view of an example layout of a metasurface antenna array.

FIG. 9 shows a top view of an example layout of a metasurface antenna array 900. The antenna array includes eight adjacent SIWs that form the 2D metasurface antenna array 900. Each SIW is 14 mm wide and there is space between the SIWs to provide room for via fences. Further, elements alternate between different sides of each SIW to reduce coupling between the elements. The array 900 can be implemented in the metasurface antenna system 800 shown in FIG. 8.

Returning back to the metasurface antenna system 800, the elements can be controlled using 8-bit, 8 channel digital to analog converters (DACs). The DACs can provide an independent bias for each metamaterial element from 0 to 5B. Further, the metasurface antenna system 800 can operate over a bandwidth of 9.6 to 10 GHz.

Figure 10A:
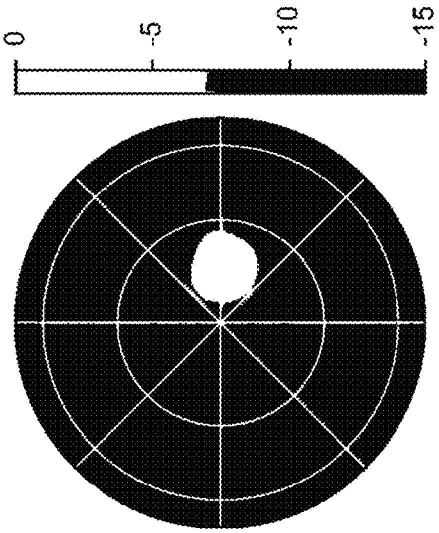
FIG. 10A shows a normalized directivity radiation pattern of a beam generated by the metasurface antenna system that is steered in azimuth to 15°.
Figure 10B:
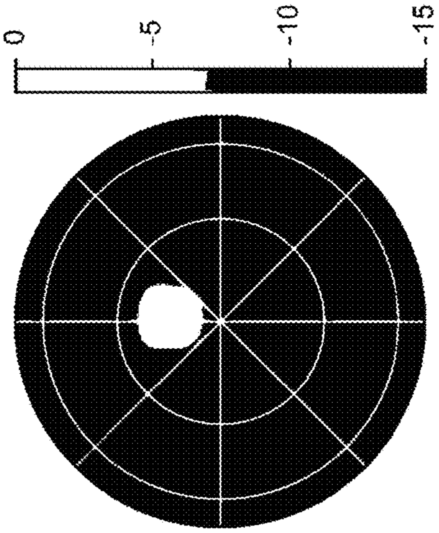
FIG. 10B shows a normalized directivity radiation pattern of a beam generated by the metasurface antenna system that is steered in elevation to 15°.
Figure 10C:
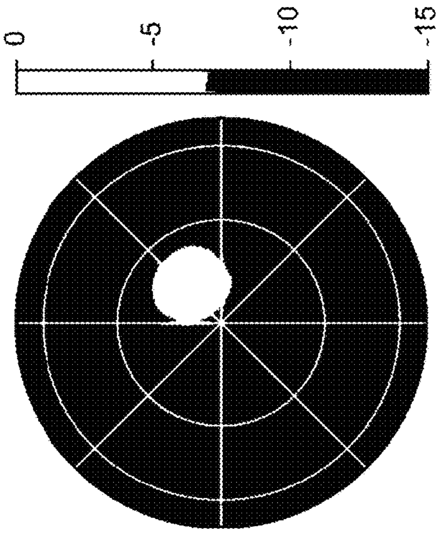
FIG. 10C shows a normalized directivity radiation pattern of a beam generated by the metasurface antenna system that is steered in azimuth to 10°.
Figure 10D:
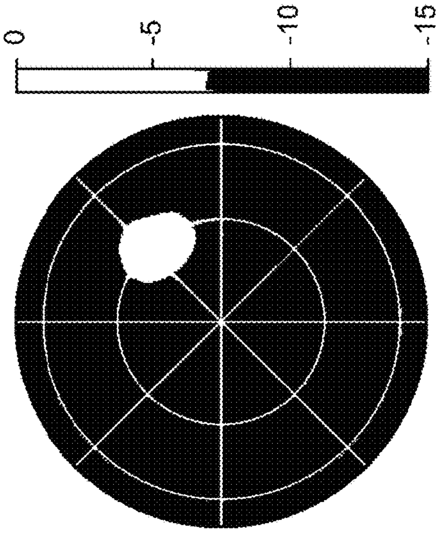
FIG. 10D shows a normalized directivity radiation pattern of a beam generated by the metasurface antenna system that is steered in elevation to 10°.

FIG. 10A shows a normalized directivity radiation pattern of a beam generated by the metasurface antenna system 800 that is steered in azimuth to 15°. FIG. 10B shows a normalized directivity radiation pattern of a beam generated by the metasurface antenna system 800 that is steered in elevation to 15°. FIG. 10C shows a normalized directivity radiation pattern of a beam generated by the metasurface antenna system 800 that is steered in azimuth to 10°. FIG. 10D shows a normalized directivity radiation pattern of a beam generated by the metasurface antenna system 800 that is steered in elevation to 10°.

Figure 11A:
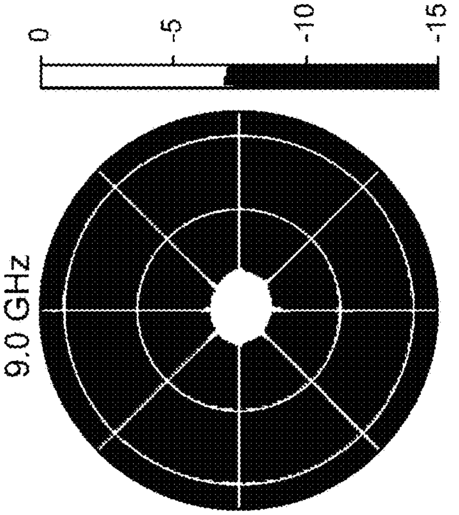
FIG. 11A shows a normalized directivity radiation pattern of a beam generated by the metasurface antenna system at a frequency of 9.0 GHz.
Figure 11B:
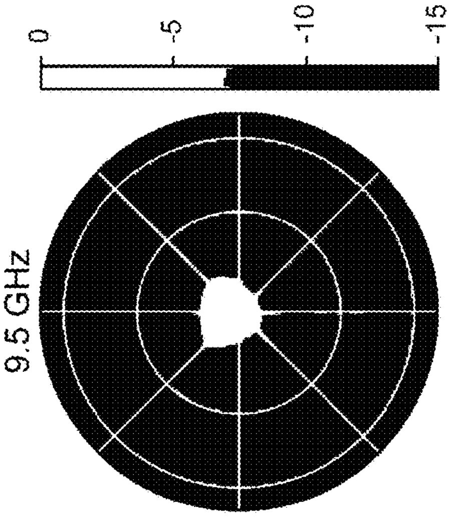
FIG. 11B shows a normalized directivity radiation pattern of a beam generated by the metasurface antenna system at a frequency of 9.5 GHz.
Figure 11C:
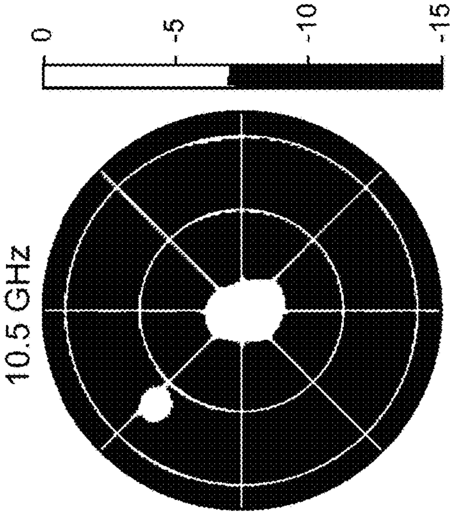
FIG. 11C shows a normalized directivity radiation pattern of a beam generated by the metasurface antenna system at a frequency of 10.5 GHz.
Figure 11D:
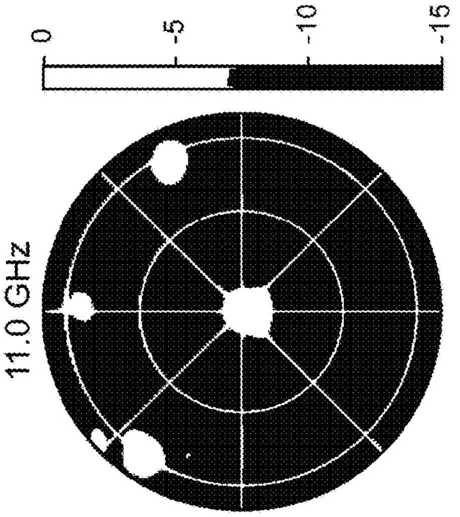
FIG. 11D shows a normalized directivity radiation pattern of a beam generated by the metasurface antenna system at a frequency of 11.0 GHz.

FIG. 11A shows a normalized directivity radiation pattern of a beam generated by the metasurface antenna system 800 at a frequency of 9.0 GHz. FIG. 11B shows a normalized directivity radiation pattern of a beam generated by the metasurface antenna system 800 at a frequency of 9.5 GHz. FIG. 11C shows a normalized directivity radiation pattern of a beam generated by the metasurface antenna system 800 at a frequency of 10.5 GHz. FIG. 11D shows a normalized directivity radiation pattern of a beam generated by the metasurface antenna system 800 at a frequency of 11.0 GHz. As shown, the metasurface antenna system 800 is capable of generating a broadside beam across a large frequency range. Further, the metasurface antenna system 800 is capable of generating multiple beams simultaneously.

Table 1 is a summary of the performance metrics of the metasurface antenna system 800.

TABLE 1

Targeted and realized antenna metrics.

| Metric | Goal | Realized |
|---|---|---|
| Bandwidth | 9.60-10.00 GHZ | 9.00-10.75 GHZ |
| Azimuth steering | ±20° | ±50° |
| Elevation steering | ±20° | ±70° |
| Sidelobe level | −13 dB | −12 dB |
| Efficiency | N/A | 11% |
| Gain | N/A | 10.8 dB |
| Polarization isolation | N/A | 30 dB |

The disclosure turns to a discussion of modeling the traveling-wave antenna arrays described herein. Specifically, an accurate model of a metasurface antenna can be used in determining the tuning of each element needed to form desired radiation patterns such as steerable, directive beams. For electrically large antennas, typical simulators that numerically solve Maxwell's equations require extremely large numbers of unknowns resulting in prohibitively long simulation times and memory storage requirements. As a means of dealing with the multiscale modeling problem, we abstract each metamaterial element as a frequency-dependent, infinitesimal, polarizable dipole, as mentioned above. Metamaterial elements are resonant structures. If the element is suitably smaller than the operational wavelength, it can be modeled as a polarizable dipole as a function of geometry and material parameters. The radiated fields can then be quickly and easily determined by summing the radiated fields from each of the effective dipoles.

Typically models that are generated for metasurface antennas are approximate models that simulate a single metamaterial element or a few metamaterial elements and then replicate the simulated results across the antennas. Such approximate models rely on the assumption that metamaterial elements do not interact. However, when a metasurface antenna array with densely packed metamaterial elements relies on this assumption, the modeled results can be inaccurate. This is because when elements are more densely spaced, the elements are more likely to interact. Spacing the elements in proximity to the Nyquist spacing limit according to the systems and methods described herein can lead to more accurate modeling through approximate modeling. Specifically, as elements are spaced at, near, or above the Nyquist spacing limit, it is more likely that they elements do not interact, thereby increasing the accuracy of an approximate model.

Figure 12:
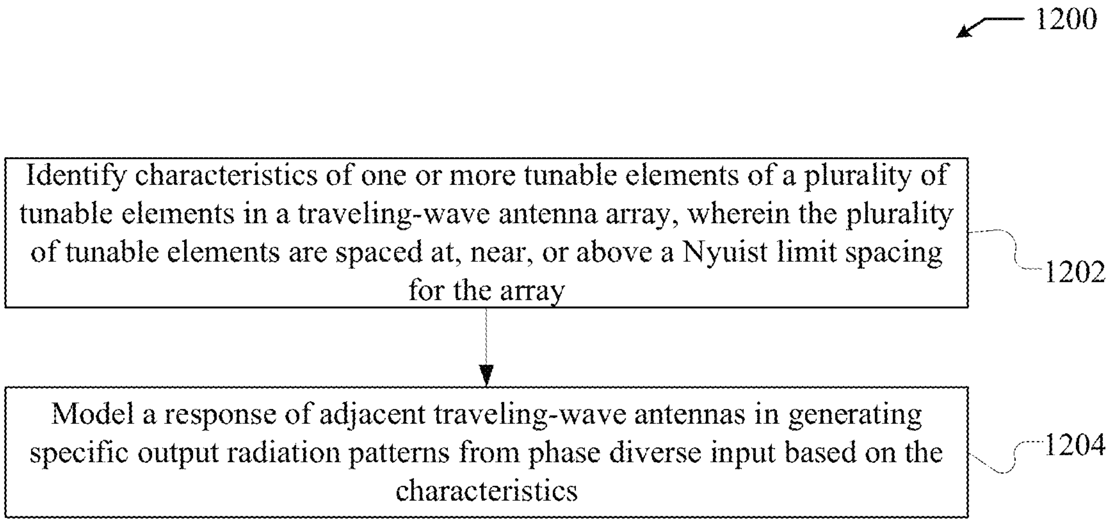
FIG. 12 is a flowchart of an example method of modeling a traveling-wave antenna system.

FIG. 12 is a flowchart 1200 of an example method of modeling a traveling-wave antenna system. The flowchart 1200 begins at step 1202, where characteristics of one or more tunable elements of a plurality of tunable elements in a traveling-wave antenna array are identified. The traveling-wave antenna array is formed by a plurality of adjacent traveling-wave antennas. The tunable elements are spaced at, near, or above the Nyquist limit spacing for the array.

The characteristics include applicable characteristics related to integration of the elements in the array. Specifically, the characteristics can include the design of the elements. In another example, the characteristics can include locations of the elements in the array.

At step 1204, a response of the adjacent traveling-wave antennas in generating specific output radiation patterns from phase diverse input is identified based on the characteristics. Specifically, the response of the adjacent traveling-wave antennas in generating the specific output radiation patterns can be modeled based on tuning values along one or more ranges of one or more tuning variables. The response can be modeled by modeling the response of one or a subset of the total plurality of tunable elements in the array. As follows, the modeled response can then be replicated across the entire plurality of tunable elements. This can be a more accurate modeling of the response when compared to models of the response of densely packed arrays because the elements are spaced at, near, or above the Nyquist limit spacing.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. An apparatus comprising:

a traveling-wave antenna array comprising a plurality of adjacent traveling-wave antennas, wherein each of the adjacent traveling-wave antennas includes:

a radiating waveguide or cavity; and a plurality of tunable elements that are arranged in a single direction along a surface of the radiating waveguide or cavity, wherein the plurality of tunable elements are spaced at, near, or above a Nyquist limit spacing for the apparatus to form an array of tunable elements across the traveling-wave antenna array;

a phase diversity feed coupled to a corresponding aperture of each adjacent traveling-wave antenna in the traveling-wave antenna array, the phase diversity feed comprising a feed waveguide or an array of passive phase shifters that is separate from each radiating waveguide or cavity, the feed waveguide providing a selected phase diverse input to two or more of the plurality of adjacent traveling-wave antennas, the phase diverse input comprising a first phase for a first traveling-wave antenna and a second phase for a second traveling-wave antenna, wherein the first and second phases are specifically selected based on one or more characteristics of the traveling-wave antenna array to suppress or eliminate grating lobes in an output radiation pattern; and a plurality of grayscale tuning elements that tune the plurality of tunable elements along one or more ranges of one or more tuning variables to form one or more specific output radiation patterns through the traveling-wave antenna array based on the input.

2. The apparatus of claim 1, wherein the plurality of adjacent traveling-wave antennas comprise a plurality of adjacent metasurface antennas.

3. The apparatus of claim 1, wherein the plurality of tunable elements include a plurality of metamaterial elements.

4. The apparatus of claim 1, wherein the plurality of grayscale tuning elements include varactor diodes.

5. The apparatus of claim 1, wherein each of the plurality of grayscale tuning elements corresponds to a single tunable element of the plurality of tunable elements and each of the plurality of grayscale tuning elements is configured to tune a corresponding tunable element on a per-tunable element basis.

6. The apparatus of claim 5, wherein each of the plurality of grayscale tuning elements is integrated as part of the corresponding tunable element.

7. The apparatus of claim 1, wherein operation of the apparatus in forming the one or more specific output radiation patterns is controlled based on modeled responses of the traveling-wave antenna array across the one or more ranges of the one or more tuning variables.

8. The apparatus of claim 7, wherein the modeled responses are generated based on limited inter-element couplings between the plurality of tunable elements that is created based on the plurality of tunable elements being spaced at, near, or above the Nyquist limit spacing.

9. The apparatus of claim 1, wherein the plurality of tunable elements are spaced at or within the range of $\lambda/2$ to $\lambda/4$.

10. A method comprising:

selecting an input to provide to a traveling-wave antenna array comprising a plurality of adjacent traveling-wave antennas through a phase diversity feed, the input including a phase diverse input to provide to two or more of the plurality of adjacent traveling-wave antennas, each of the adjacent traveling-wave antennas including a radiating waveguide or cavity and a plurality of tunable elements that are arranged in a single direction along a surface of the radiating waveguide or cavity, wherein the plurality of tunable elements are spaced at, near, or above a Nyquist limit spacing for the traveling-wave antenna array to form an array of tunable elements across the traveling-wave antenna array, the phase diversity feed comprising a feed waveguide or an array of passive phase shifters that is separate from each radiating waveguide or cavity and coupled to a corresponding aperture of each adjacent traveling-wave antenna in the traveling-wave antenna array, the phase diverse input comprising a first phase for a first traveling-wave antenna and a second phase for a second traveling-wave antenna, wherein the first and second phases are specifically selected based on one or more characteristics of the traveling-wave antenna array to suppress or eliminate grating lobes in one or more specific output radiation patterns;

selecting tuning values along one or more ranges of one or more tuning variables for tuning the plurality of tunable elements to form the one or more specific output radiation patterns;

providing the input to the traveling-wave antenna array through the phase diversity feed; and tuning the plurality of tunable elements through a plurality of grayscale tuning elements according to the tuning values to form the one or more specific output radiation patterns from the input.

11. The method of claim 10, wherein the plurality of adjacent traveling-wave antennas comprise a plurality of adjacent metasurface antennas.

12. The method of claim 10, wherein the plurality of tunable elements include a plurality of metamaterial elements.

13. The method of claim 10, wherein the plurality of grayscale tuning elements include varactor diodes.

14. The method of claim 10, wherein each of the plurality of grayscale tuning elements corresponds to a single tunable element of the plurality of tunable elements and each of the plurality of grayscale tuning elements is configured to tune a corresponding tunable element on a per-tunable element basis.

15. The method of claim 14, wherein each of the plurality of grayscale tuning elements is integrated as part of the corresponding tunable element.

16. The method of claim 10, wherein either or both the input and the tuning values are selected based on modeled responses of the traveling-wave antenna array across the one or more ranges of the one or more tuning variables.

17. The method of claim 16, wherein the modeled responses are generated based on limited inter-element couplings between the plurality of tunable elements that is created based on the plurality of tunable elements being spaced at, near, or above the Nyquist limit spacing.

18. The method of claim 16, wherein the plurality of tunable elements are spaced at or within the range of λ/2 to λ/4.

19. A system comprising:

one or more processors; and at least one computer-readable storage medium having stored therein instructions which, when executed by the one or more processors, cause the one or more processors to perform operations comprising:

identify characteristics of one or more of a plurality of tunable elements in a traveling-wave antenna array comprising a plurality of adjacent traveling-wave antennas, wherein each adjacent traveling wave antenna includes a radiating waveguide or cavity and a plurality of tunable elements that are arranged in a single direction along a surface of the radiating waveguide or cavity, wherein the plurality of tunable elements are spaced at, near, or above a Nyquist limit spacing for the traveling-wave antenna array to form an array of tunable elements across the traveling-wave antenna array; and model a response of the adjacent traveling-wave antennas in generating specific output radiation patterns from input including phase diverse input fed to two or more of the plurality of adjacent traveling-wave antennas over tuning values along one or more ranges of one or more tuning variables applied through a plurality of grayscale tuning elements to generate the specific output radiation patterns, wherein the phase diverse input is fed by a phase diversity feed coupled to a corresponding aperture of each adjacent traveling-wave antenna in the traveling-wave antenna array, the phase diversity feed comprising a feed waveguide or an array of passive phase shifters that is separate from each radiating waveguide or cavity, the feed waveguide or an array of passive phase shifters providing a selected phase diverse input to two or more of the plurality of adjacent traveling-wave antennas, the phase diverse input comprising a first phase for a first traveling-wave antenna and a second phase for a second traveling-wave antenna, wherein the first and second phases are specifically selected based on the identified characteristics of the traveling-wave antenna array to suppress or eliminate grating lobes in the specific output radiation patterns.

* * * * *